April 21, 1931.   A. W. HAYDON   1,801,958
REVERSING SINGLE PHASE INDUCTION MOTOR Filed Oct. 11, 1928

To Mains RR'

INVENTOR
Arthur William Haydon
BY
ATTORNEY

Patented Apr. 21, 1931

1,801,958

UNITED STATES PATENT OFFICE

ARTHUR WILLIAM HAYDON, OF HINSDALE, ILLINOIS

REVERSING SINGLE-PHASE INDUCTION MOTOR

Application filed October 11, 1928. Serial No. 311,777.

This invention relates to a reversing single phase induction motor, which has for its object the production of reversing or intermittent motive power, and as one application thereof, and as part of the present invention, I have combined and incorporated the induction motor with a magnetic escapement to act as the timing element in a clock train. It will be understood, however, that, although the induction motor of the present invention combines advantageously with the magnetic escapement, it is adapted for other uses, so that unless claimed in the combination stated it is not intended to so limit the invention.

The invention is directed to a single phase induction motor which is not electrically self-starting, to the rotor element of which is attached a spring or other equivalent mechanism or instrumentality adapted to store up energy from the motor while running in a given direction, to be thereafter expended in initiating rotation of the motor in the opposite direction.

Although in the particular embodiment of the invention shown I have attached the spring directly to the rotor, it will be understood that, throughout the specification and claims, where I refer to the spring, or the equivalent thereof, as being attached to the rotor, I intend to include by this expression any system of gears, levers, or other similar mechanism which may be provided to control, either directly or indirectly, the motion of said rotor.

Throughout the present specification, the term "single phase induction motor which is not electrically self-starting" will be understood to refer to an induction motor which has no split phase winding, shaded poles, or commuted winding, or other means of producing torque when the motor is motionless, and in which the rotor is geographically non-polar and has a practically uniform reluctance and reactance in all directions, so that when placed in a motor field it will have no tendency to assume any definite position in relation to the field poles.

In view of the above characteristics, it is possible to employ such a motor in conjunction with a spring or the like to measure units of time by periodic reversals of the direction of rotation, so that the mechanism is one which may readily serve as the time measuring instrumentality in association with the clock train, and in order to utilize this capacity to the utmost advantage, I have devised and combined with the motor a magnetic escapement which is adapted through proper connections to actuate the clock train or the like in the manner presently to be described. It will be understood, however, that the motor and magnetic escapement are not limited in use to association with a clock train, since it may be advantageously employed in other circumstances in which accurate timing is required.

Further objects and details of the invention will appear from the description thereof, in conjunction with the accompanying drawing, wherein,—

Referring particularly to the Diagram 1, it will be noted that if the primary A of said induction motor is connected with a single phase circuit when the secondary B is at rest, the magnetic poles in the primary A do not rotate and no torque tending to start the rotor B is developed; but if the rotor B is started in either direction, the resultant effects of the primary current and the induced current in the secondary produce a revolving magnetic field and consequent torque. This torque continues the movement of the rotor B until the spring C attached thereto is so distorted that its tension overcomes the torque and momentum of the rotor B. The rotor B, having been stopped, the magnetic field ceases to revolve, and the torque discontinues.

The momentum and torque disappearing, the energy stored in the spring C starts the rotor B in the reverse direction, builds a rotating field and torque in that direction, which torque carries the rotor B past the point of equilibrium of the spring C and continues its movement until the spring C is so distorted in the opposite direction that its tension overcomes the torque and momentum of the rotor B as before. This action repeats, the rotor B oscillating in uniform periods of time (like the balance wheel of a clock) according to well known physical principles.

Some of the practical uses of this reversing motor are:

1. In clocks, master clocks, laboratory timers, or for operating switching apparatus for producing electric impulses at equal time periods.
2. For driving planers and shapers.
3. For driving oscillating mechanisms, such as washing machines and agitators.

*Magnetic escapement*

The magnetic escapement employed in the present instance, in combination with the reversing single phase induction motor, is designed to utilize the timed oscillations imparted to the rotor in such a way as to periodically strengthen the magnetic field of the escapement, so that during an instant in each oscillation the strength of the field will be sufficiently increased to operate suitable mechanism to actuate the clock train or other mechanism for which a timed operation is requisite.

In the form shown, the magnetic escapement comprises an aluminum disk mounted on the shaft F F' which carries the rotor B, which disk is provided at a single point with a segment of iron I in the aluminum disk. The disk is mounted to bring its edge into intercepting relation with the core J of an electromagnet, which core stands in opposed relation to the end of a movable arm K pivoted on a shaft M. O and O' are stops which limit the movement of the movable arm and prevent the same from coming into actual contact with the disk H, or from moving too far in the opposite direction to be influenced by the magnetic field.

Figure 2:
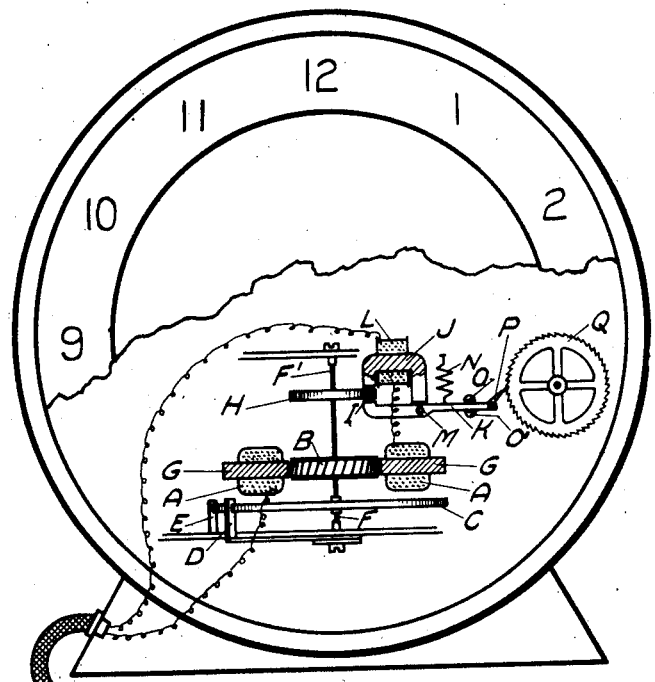
Fig. 2 is a view partly in section, showing the motor in associated relation with the magnetic escapement.

The movable arm has connected therewith a spring N which normally holds the inner end of the arm in distant relation to the disk H carrying the iron segment I, the strength of the spring being such as to maintain the arm in the position indicated, save at the instant during which the iron segment passes immediately below the pole of the magnet, as shown in Fig. 2, at which instant the magnetic field is momentarily strengthened to the degree required to overcome the pull of the spring N and move the arm K over to the stop O', thus allowing the pawl P to slip over a single tooth on the ratchet wheel Q. As soon as the iron segment is carried away from the point of proximity to the magnetic core, the field will again be weakened, thereby allowing the spring N to act and cause the pivoted arm K to lift sufficiently to advance the ratchet wheel a single tooth. The ratchet wheel Q is connected to an ordinary clock train of the correct ratio to make the hands or other indicating devices move properly.

Figures 1, 3:
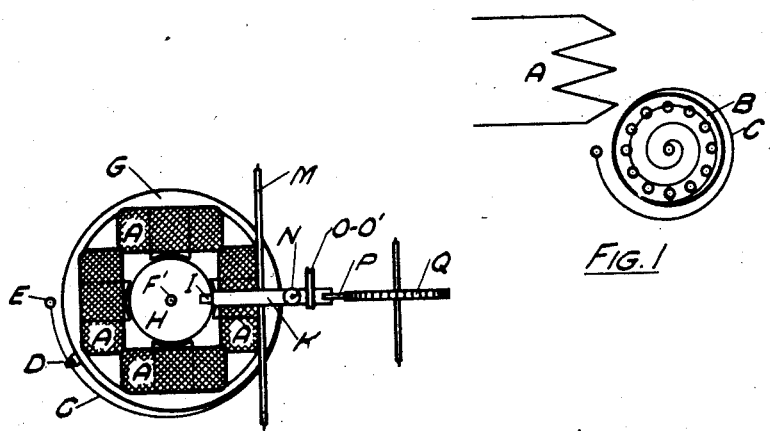
Figure 1 is a diagrammatic view of the features involved in the operation of the induction motor.
Fig. 3 is a plan view of the motor and the magnetic escapement.

Referring to Figs. 2 and 3, the coil L is connected (preferably in series) with the primary A and a single phase circuit supply R R'. The iron segment I is in such relation to the spring C that it is directly between the core J and the arm K when the spring C is at equilibrium. The iron segment I is in this position when the current is turned on, so that the coil L has a high inductance, which cuts down the current through it and the primary A, and prevents a tendency for the same to become overheated while the rotor B is not in motion.

The stationary end of the spring C is fastened to the post E. D is an arm which serves as a regulator for the clock, as in any ordinary clock.

*Operation*

To start the rotor B oscillating, it is necessary to give the clock a sudden twist about the axis F F' (similar to starting any small clock). Having been once started, the rotor B will continue to oscillate as explained before, in uniform timed intervals. At each half oscillation, the iron segment I passes between the core J and the arm K, causing the arm K to operate the ratchet Q, as explained above. When the aluminum disk H is passing between the core J and the arm K, a "dragging force" is produced due to eddy currents in the disk. This dragging force prevents the rotor B from attaining an undesirably high speed (as would be the case when operating on 60 cycle current using a four pole primary A), thus reducing the necessary size of the spring C and giving the escapement more time to operate.

A rise in voltage between the mains R R' would increase the strength of the field produced by the coil L, which would increase proportionately the dragging force produced by the movement of the disk H, and tend to neutralize the increased torque of the rotor B. J may be a permanent magnet thus eliminating the coil L, but the compensating ability of the coil L, as explained above, will be lost.

The aluminum disk H may be eliminated (leaving the iron segment) if the reluctance of the motor elements, A and B, is increased, or if a sufficient number of poles are in the primary A. The use of the aluminum disk H seems the most practical arrangement, however, for 60 cycle current supply.

The drawings, Figures 1, 2 and 3, are intended only to show the principles of operation of these mechanisms and do not represent the size, shape, or relative position of the various parts thereof, or the materials of which they are made.

Although the invention has been described with particularity as to detail, it is obvious that the details of the mechanism employed for utilizing the principles set forth may be changed or modified, and the device used in association with mechanisms of various descriptions, without departing from the spirit of the invention.

I claim:

1. In an induction motor which is not self-starting, the combination of a stationary element, an oscillating element, means connected with the oscillating element for limiting the extent of the oscillation thereof in one direction and storing up energy for the starting of the motor in the reverse direction, to effect timed oscillations of the oscillating element, an electro-magnet, a member in proximate relation to the magnet and adapted to be actuated thereby when the magnetic field is at a maximum, and a member of magnetizable material connected with the oscillating element of the motor and positioned to be brought momentarily into contiguous relation to the magnet during each oscillation to momentarily bring the field to a maximum, and mechanism adapted to be actuated by the magnet-controlled element at the timed intervals.

2. In an induction motor which is not self-starting, the combination of a stationary element, an oscillating element, a spring connected with the oscillating element and adapted to impart a torque to the oscillating element when moved in either direction past the relaxed position of the spring, for storing up energy during an oscillation in one direction, to be expended in initiating oscillation in the opposite direction, an electro-magnet, a member in proximate relation to the magnet and adapted to be actuated thereby when the magnetic field is at a maximum, and a member of magnetizable material connected with the oscillating element of the motor and positioned to be brought momentarily into contiguous relation to the magnet during each oscillation to momentarily bring the field to a maximum, and mechanism adapted to be actuated by the magnet-controlled element at the timed intervals.

3. In an induction motor which is not self-starting, the combination of a stationary element, an oscillating element, a member connected with the oscillating element and adapted to impart a torque to the oscillating element when moved in either direction past the normal position of the member, for storing up energy during an oscillation in one direction, to be expended in initiating oscillation in the opposite direction, an electro-magnet, a member in proximate relation to the magnet and adapted to be actuated thereby when the magnetic field is at a maximum, and a member of magnetizable material connected with the oscillating element of the motor and positioned to be brought momentarily into contiguous relation to the magnet during each oscillation to momentarily bring the field to a maximum, and mechanism adapted to be actuated by the magnet-controlled element at the timed intervals.

4. In an induction motor which is not self-starting, the combination of a stationary element, an oscillating element, means connected with the oscillating element for limiting the extent of the oscillation thereof in one direction and storing up energy for the starting of the motor in the reverse direction, to effect timed oscillations of the oscillating element, an electro-magnet, a member in proximate relation to the magnet and adapted to be actuated thereby when the magnetic field is at a maximum, and a member of magnetizable material connected with the oscillating element of the motor and positioned to be brought momentarily into contiguous relation to the magnet during each oscillation to momentarily bring the field to a maximum, and dog and ratchet mechanism adapted to be actuated by the magnet-controlled element at the timed intervals.

5. In an induction motor which is not self-starting, the combination of a stationary element, an oscillating element, a spring connected with the oscillating element and adapted to impart a torque to the oscillating element when moved in either direction past the relaxed position of the spring, for storing up energy during an oscillation in one direction, to be expended in initiating oscillation in the opposite direction, an electro-magnet, a member in proximate relation to the magnet and adapted to be actuated thereby when the magnetic field is at a maximum, and a member of magnetizable material connected with the oscillating element of the motor and positioned to be brought momentarily into contiguous relation to the magnet during each oscillation to momentarily bring the field to a maximum, and dog and ratchet mechanism adapted to be actuated by the magnet-controlled element at the timed intervals.

6. In an induction motor which is not self-starting, the combination of a stationary element, an oscillating element, a member connected with the oscillating element and adapted to impart a torque to the oscillating element when moved in either direction past the normal position of the member, for storing up energy during an oscillation in one direction, to be expended in initiating oscillation in the opposite direction, an electro-magnet, a member in proximate relation to the magnet and adapted to be actuated thereby when the magnetic field is at a maximum, and a member of magnetizable material connected with the oscillating element of the motor and positioned to be brought momentarily into contiguous relation to the magnet during each oscillation to momentarily bring the field to a maximum, and dog and ratchet mechanism adapted to be actuated by the magnet-controlled element at the timed intervals.

7. In mechanism which is not self-starting, the combination of a member of magnetizable material, an electro-magnet in proximate relation to said member, means for imparting back and forth movements to said member to bring the same momentarily into proximate relation to the magnet to momentarily strengthen the magnetic field, and a member adapted to be actuated by the magnet when the field is momentarily strengthened.

8. In mechanism which is not self-starting, the combination of a member mounted for oscillation, means for imparting timed oscillations to said member, said oscillating member including a portion of magnetizable material, an electro-magnet having a pole in proximate relation to the path of movement of said magnetizable portion of the oscillating member, the relation of the parts serving to momentarily strengthen the magnetic field when the parts are in proximate relation, a member adapted to be drawn toward the magnet with each strengthening of the field, and a train of mechanisms actuated by said member.

9. In mechanism which is not self-starting, the combination of a member mounted to oscillate and including a portion formed of magnetizable material, means for imparting timed oscillations to said oscillating member, an electro-magnet having a pole in proximate relation to the path of movement of said magnetizable portion, the relation being such as to momentarily cause a strengthening of the magnetic field when the parts are in aligned relation, a pivoted arm having one of its ends in spaced relation to the pole of the electro-magnet and below the path of movement of the oscillating magnetizable portion and adapted to be drawn toward the magnet when the magnetizable portion is aligned with the pole of the magnet, and mechanism intermittently actuated by the movements of said pivoted arm.

10. In an oscillatory device of the class described, the combination with a single-phase non-self-starting electric motor of the type provided with a rotor having capacity for continuous rotation in either direction and capacity for remaining in a state of substantially-neutral equilibrium when at rest despite active electro-magnetic forces exerted by the motor-field; of energy-storing means connected to the said rotor for reversing the direction thereof, and characterized by its capacity for offering progressively-increasing resistance to the rotary movement of the said rotor in either direction from the middle or intermediate position thereof; whereby the rate of oscillation of the rotor is rendered substantially independent of appreciable variations in the voltage and frequency of the current supplied to the motor.

11. In an oscillatory device of the class described, the combination with a single-phase non-self-starting electric motor of the type provided with a rotor having capacity for continuous rotation in either direction and capacity for remaining in a state of substantially-neutral equilibrium when at rest despite active electro-magnetic forces exerted by the motor-field; of an energy-storing spring connected to the said rotor for reversing the direction thereof, and characterized by its capacity for offering progressively-increasing resistance to the rotary movement of the said rotor in either direction from the middle or intermediate position thereof; whereby the rate of oscillation of the rotor is rendered substantially independent of appreciable variations in the voltage and frequency of the current supplied to the motor.

12. In an oscillatory device of the class described, the combination with a single-phase non-self-starting electric motor of the type provided with a rotor having capacity for continuous rotation in either direction and capacity for remaining in a state of substantially-neutral equilibrium when at rest despite active electro-magnetic forces exerted by the motor-field; of an energy-storing torsion-spring connected to the said rotor for reversing the direction thereof, and characterized by its capacity for offering progressively-increasing resistance to the rotary movement of the said rotor in either direction from the middle or intermediate position thereof; whereby the rate of oscillation of the rotor is rendered substantially independent of appreciable variations in the voltage and frequency of the current supplied to the motor.

In witness that I claim the foregoing I have hereunto subscribed my name this 5th day of October, 1928.

ARTHUR WILLIAM HAYDON.